United States Patent
Lee et al.

(10) Patent No.: US 12,495,553 B2
(45) Date of Patent: Dec. 9, 2025

(54) 3D SYNAPSE DEVICE STACK, 3D STACKABLE SYNAPSE ARRAY USING THE 3D SYNAPSE DEVICE STACKS AND METHOD OF FABRICATING THE STACK

(71) Applicant: Seoul National University R&DB FOUNDATION, Seoul (KR)

(72) Inventors: Jong-Ho Lee, Seoul (KR); Young-tak Seo, Seongnam-si (KR); Soochang Lee, Seoul (KR); Seongbin Oh, Seoul (KR); Jangsaeng Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 721 days.

(21) Appl. No.: 17/888,772

(22) Filed: Aug. 16, 2022

(65) Prior Publication Data
US 2023/0053693 A1 Feb. 23, 2023

Related U.S. Application Data

(60) Provisional application No. 63/233,939, filed on Aug. 17, 2021.

(51) Int. Cl.
*G06N 3/02* (2006.01)
*G06N 3/063* (2023.01)
(Continued)

(52) U.S. Cl.
CPC ............. *H10B 43/27* (2023.02); *G06N 3/063* (2013.01); *G11C 16/08* (2013.01); *H10B 43/35* (2023.02);
(Continued)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS

2018/0232628 A1* 8/2018 Park .................. G06N 3/063
2025/0094380 A1* 3/2025 Mazed ................ G01S 17/08

OTHER PUBLICATIONS

Si, et al., A Twin-8T SRAM Computation-In-Memory Macro for Multiple-Bit CNN-Based Machine Learning, 2019 IEEE International Solid-State Circuits Conference.
(Continued)

*Primary Examiner* — Hung D Le
(74) *Attorney, Agent, or Firm* — CANTOR COLBURN LLP

(57) ABSTRACT

Provided is a 3D synapse device stack, a 3D stackable synapse array using the same, and a method for manufacturing the 3D synapse device stack. The 3D synapse device stack comprises: a body electrode disposed on a substrate in a vertical direction; a plurality of first insulating layers and third oxide layers alternately stacked on the outer circumferential surface of the body electrode; a plurality of semiconductor bodies disposed on an outer circumferential surface of the third oxide layer; a plurality of sources alternately stacked with first insulating layers on outer circumferential surfaces of the semiconductor bodies positioned on a first side surface of the body electrode; a plurality of drains alternately stacked with first insulating layers on outer circumferential surfaces of the semiconductor bodies positioned on a second side surface of the body electrode; a plurality of word lines alternately stacked with first insulating layers on outer circumferential surfaces of the semiconductor bodies positioned on a third side surface of the body electrode; and an insulator stack positioned between the word line and the semiconductor body. The semiconductor body, the source, the drain, the insulator stack and the word line located on the same layer on the outer peripheral surface of the body electrode constitute a synapse device, or a part thereof. The synapse device stack may implement an AND-type or NOR-type synapse array.

9 Claims, 20 Drawing Sheets

(51) Int. Cl.
*G11C 16/08* (2006.01)
*H10B 43/27* (2023.01)
*H10B 43/35* (2023.01)
*H10B 43/40* (2023.01)
*H10B 51/20* (2023.01)
*H10B 51/40* (2023.01)
*G11C 16/04* (2006.01)

(52) U.S. Cl.
CPC ............. *H10B 43/40* (2023.02); *H10B 51/20* (2023.02); *H10B 51/40* (2023.02); *G11C 16/0483* (2013.01)

(58) Field of Classification Search
CPC ....... G05B 13/00; H03M 7/30; H04N 9/8042; G06T 9/00
See application file for complete search history.

(56) References Cited

OTHER PUBLICATIONS

Sun, et al., XNOR-RRAM: A Scalable and Parallel Resistive Synaptic Architecture for Binary Neural Networks, Design, Automation And Test in Europe, 2018.

\* cited by examiner

AND-type

NOR-type

| FN Program | WL | DL & SL | PL |
|---|---|---|---|
| Selected | $V_{PGM}$ (8 V) | 0 V | 0 V |
| Unselected | 0 V | 0 V | 0 V |

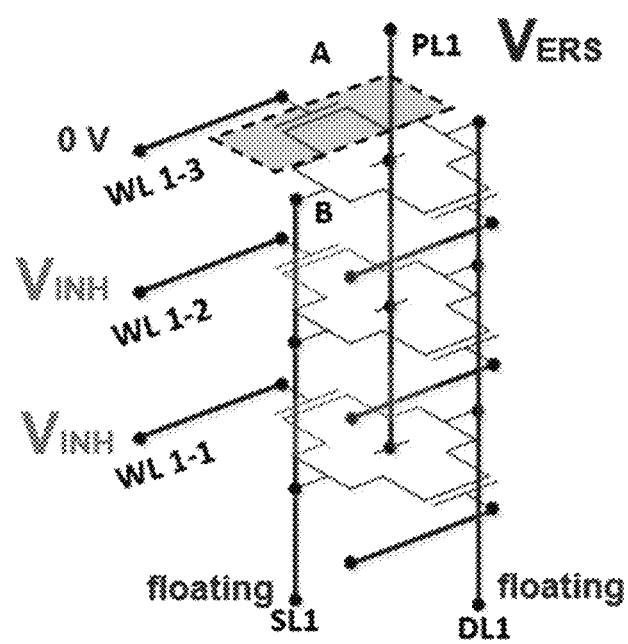

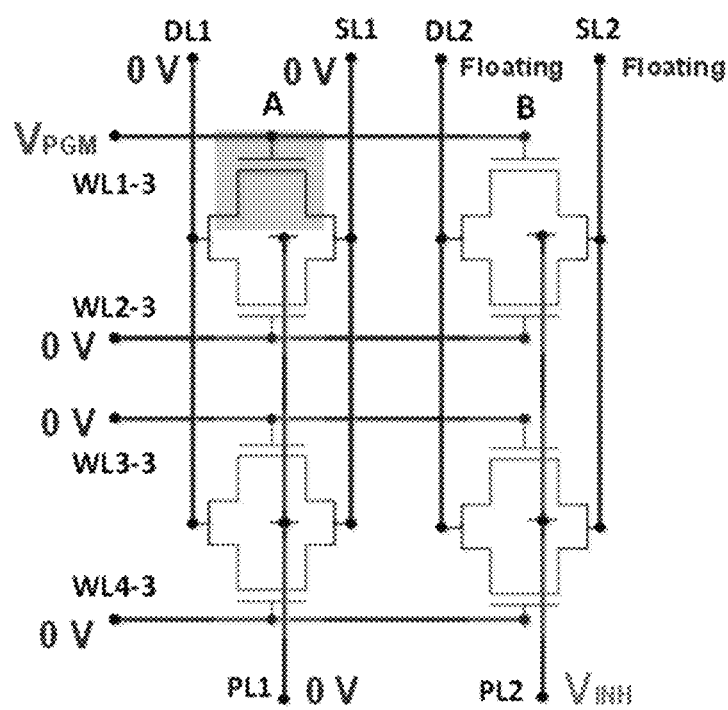

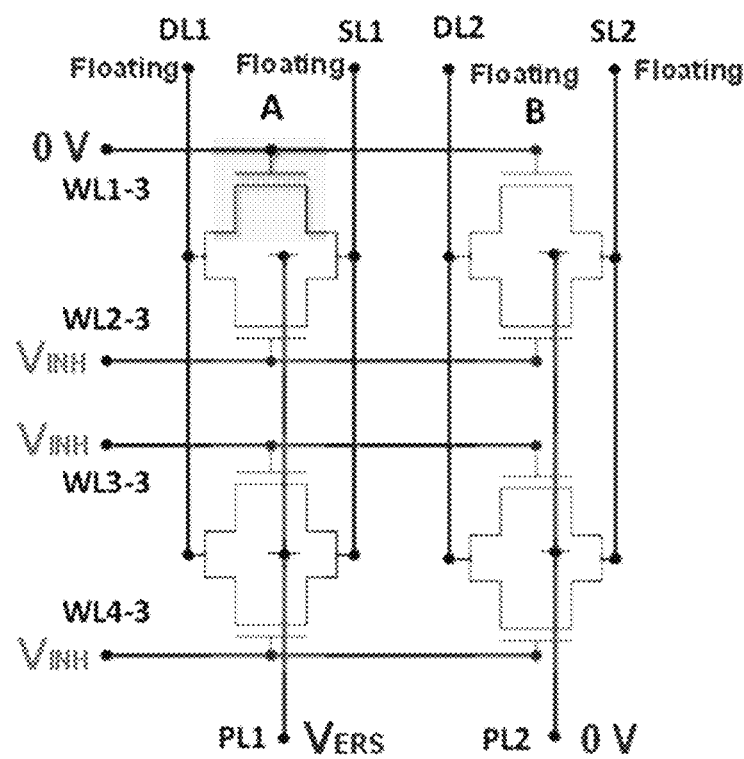

3D SYNAPSE DEVICE STACK, 3D STACKABLE SYNAPSE ARRAY USING THE 3D SYNAPSE DEVICE STACKS AND METHOD OF FABRICATING THE STACK

TECHNICAL FIELD

The present invention relates to a three-dimensional synapse device stack, a three-dimensional stackable synapse array using the same, and a method for manufacturing the three-dimensional synapse device stack, and more specifically, to a three-dimensional stackable synapse array capable of improving the degree of integration and improving operational reliability by implementing an AND-type synapse array or NOR-type synapse array in a three-dimensional stackable form and a method for manufacturing the same.

BACKGROUND ART

In recent years, many approaches have been made to imitate nervous systems of animals as power consumption has increased significantly and heat release problems have become more serious in integrated circuits based on the von Neumann architecture. Particularly, in the techniques imitating the nervous systems of animals, it is possible to improve the cognitive function and the determining function by enabling cognitive function and learning while greatly reducing power consumption. As a result, there is an opportunity to replace or greatly improve the functionality of the existing von Neumann integrated circuits. Therefore, much attention has been increasingly paid to the techniques, and the need for research has been greatly increased.

The basic function of neurons is to generate electrical spikes and transmit information to other cells in a case where a stimulus exceeds a threshold value. The resulting electrical signal is called an action potential. Neurons may be roughly divided into three portions. The neuron includes a nerve cell body where a nucleus exists, a dendrite which receives a signal from another cell, and an axon which transmits a signal to another cell. A portion which transmits a signal between the dendrites is called a synapse.

The neuron receives a stimulus from another nerve cell or a stimulus receptor cell and transmits the stimulus to another nerve cell or a glandular cell. Exchanging the stimulus occurs at the synapse. One nerve cell (neuron) receives stimuli through a number of synapses and integrates the excitations, and after that, the nerve cell transmits an electrical spike to an axon near to the nerve cell body, so that the electrical spike reaches the synapse. In this manner, the transmission of the excitations from the neuron through the synapses to another nerve cell is referred to as excitation transmission. The excitation at the synapse is transmitted only from a nerve fiber toward a nerve cell body or a dendrite and is not transmitted in the reverse direction, so that the excitation is transmitted in only one direction as a whole. In addition, the synapses are not only relay sites that transmit the excitations but the synapses also cause weighting or inhibition according to temporal or spatial change in excitations reaching the synapses to enable higher level integration of the nervous system.

On the other hand, besides the synapses having the action of transmitting the excitation, there are synapses having the action of inhibiting the transmission of the excitations from other nerve cells. These synapses are called inhibitory synapses. When the excitation transmitted along some nerve fibers reaches the inhibitory synapse, the inhibitory transmitting material is secreted from the synapse. This inhibitory transmitting material acts on a cell membrane of the nerve cell connected to the synapse to inhibit the excitations of the cell from occurring (occurrence of an action potential). As a result, while the inhibitory transmitting material acts, the excitation reaching other synapses is not transmitted to the synapse.

Recently, various studies have been conducted to implement neural networks using RRAM devices (Xiaoyu Sun et al., "XNOR-RRAM: A Scalable and Parallel Resistive Synapse Architecture for Binary Neural Networks", 2018 Design, Automation & Test in Europe Conference & Exhibition). However, in the case of Memristor-based synapses of the prior art, there is a disadvantage in that the reliability of the device is not good and the dispersion between the devices is large.

Also, recent attempts have been made to implement neural networks using SRAM devices (Si, X., et at, "A twin-8T SRAM computation-in-memory macro for multiple-bit CNN-based machine learning" In 2019 IEEE International Solid-State Circuits Conference-(ISSCC), pp. 396-398) However, implementing a neural network using an SRAM device according to the above-described prior art has good reliability, but has a disadvantage of low integration by using multiple devices.

Therefore, the present invention provides three-dimensional stackable synapse array architectures that can operate with low power and high reliability while increasing the degree of integration.

SUMMARY OF THE INVENTION

In order to solve the problems of the prior art described above, an object of the present invention is to provide a three-dimensional synapse device stack that can be implemented as an AND-type synapse array or a NOR-type synapse array and has an excellent degree of integration and improved reliability.

Another object of the present invention is to a three-dimensional stackable synapse array using the three-dimensional synapse device stack.

Another object of the present invention is to provide a method for manufacturing the three-dimensional synapse device stack.

According to one aspect of the present invention, there is provided a three-dimensional synapse device stack, which comprises: a substrate having an upper surface formed of a first oxide layer; a body electrode having a pillar shape, made of an electrically conductive material and disposed on the substrate; a plurality of first insulating layers disposed on an outer circumferential surface of the body electrode; a plurality of third oxide layers disposed on the outer circumferential surface of the body electrode and alternately stacked with the first insulating layers; a plurality of semiconductor bodies made of a semiconductor material, dispsed on the outer circumferential surface and the surface of the third oxide layers, electrically connected to the body electrode, and alternately stacked with the first insulating layers; a plurality of sources disposed on outer circumferential surfaces of the semiconductor bodies and alternately stacked with first insulating layers positioned on a first side surfaces of the body electrode; a plurality of drains disposed on outer circumferential surface of the semiconductor bodies and alternately stacked with the first insulating layers positioned on a second side surface of the body electrode opposite to the first side surface: a source line electrode having a pillar shape, made of an electrically couductive material, disposed on a substrate a vertical direction and electrically connected to the plurality of sources; a drain line electrode having a pillar shape, made of an electrically couductive material, disposed on a substrate a vertical direction and electrically connected to the plurality of drains: a plurality of word lines disposed on outer circumferential surfaces of the semiconductor bodies and alternately stacked with first insulating layers positioned on a third side surface of the body electrode; and a plurality of insulator stacks positioned between the word lines and the semiconductor bodies, wherein the semiconductor body, the source, the drain, the insulator stack and the word line located on the same layer on the outer peripheral surface of the body electrode constitute a synapse device or a part thereof, and the synapse devices electrically isolated from each other by the first insulating layers and the third oxide layers are stacked to form a stack structure.

In the three-dimensional synapse device stack according to the present invention, preferably the insulator stack is composed of a single insulating layer or a stack structure in which a plurality of layers are stacked; and when configured in a stack structure, the insulator stack comprises at least a charge storage layer and an insulating layer, at least a ferroelectric layer and an insulating layer, at least a resistance change layer and an insulating layer, or at least a phase change layer and an insulating layer.

In the three-dimensional synapse device stack according to the present invention, preferably the three-dimensional synapse device stack further comprises a body electrode landing pad located in the first oxide layer and made of an electrically conductive material and electrically connected to the body electrode; and/or further comprises: a source electrode landing pad located in the first oxide layer and made of an electrically conductive material and electrically connected to the source line electrode; and a drain electrode landing pad disposed in the first oxide layer and made of an electrically conductive material and electrically connected to the drain line electrode.

In the three-dimensional synapse device stack according to the present invention, preferably the three-dimensional synapse device stack further comprises an additional stack structure which shares the source line electrode and the drain line electrode and includes a plurality of additional word lines disposed on outer circumferential surfaces of the semiconductor bodies and alternately stacked with first insulating layers disposed on a fourth side surface of the body electrode opposite to the third side surface; and a plurality of additional insulator stacks disposed between the additional word lines and the semiconductor bodies, wherein the semiconductor body, the source, the drain, the additional insulator stack and the additional word line located on the same layer on the outer circumferential surface of the body electrode constitute an additional synapse device or a part thereof, and the synapse device and the additional synapse device located on the same layer share a source and a drain.

According to another aspect of the present invention, there is provided a three-dimensional stackable synapse array, characterized in that the three-dimensional synapse device stacks according to the present invention are arranged in an array form.

In the three-dimensional stackable synapse array according to the present invention, preferably the three-dimensional stackable synapse array constitutes an AND-type synapse array by arranging the source line electrodes and the drain line electrodes connecting the three-dimensional synapse device stacks side by side, or a NOR-type synapse array by arranging the source line electrodes and the drain line electrodes connecting the three-dimensional synapse device stacks to cross each other.

In the three-dimensional stackable synapse array according to the present invention, preferably the three-dimensional stackable synapse array further comprises a three-dimensional capacitor stack having the same structure as a three-dimensional synapse device stack; and/or a CMOS integrated circuit used as a peripheral circuit under the substrate.

According to another aspect of the present invention, there is provided a method of manufacturing a three-dimensional synapse device stack comprising the following steps: (a) forming a stacked structure by alternately and repeatedly depositing first insulating layers and second insulating layers on a substrate; (b) etching predetermined regions of the stacked structure using a photolithography process to form a first etch hole, a second etch hole, a third etch hole, and a trench for stack isolation, and to the etched regions of the stacked structure depositing a passivation material and planarizing the surface; (c) selectively etching the passivation material filled in the first etch hole to expose the first etch hole, selectively etching a part of the second insulating layers from the surface of the first etch hole to be recessed, depositing a semiconductor material in the recssed region to form a semiconductor body; (d) filling only the inside of the recessed region is formed with an oxide material, and forming a body electrode made of a conductive material in the exposed region; (e) selectively etching the passivation material filled in the second and third etch holes, selectively etching a second insulating layer from the surfaces of the second and third etch holes to be recessed, and depositing a highly doped semiconductor material in the recessed spaces and the second and the third etch holes to form a plurality of sources, a plurality of drains, a source line electrode connected to the sources, and a drain line electrode connected to the drains; and (f) selectively etching the passivation material filled in the trench for stack isolation, selectively etching the second insulating layers from the surface of the trench for stack isolation to be recessed, depositing insulator stacks on the surfaces of the recessed spaces, and depositing a conductive material and then etching to form a plurality of word lines isolated electraically for each layer.

In the method of manufacturing a three-dimensional synapse device stack according to the present inventioin, preferably the step (a) is performed by: forming an oxide layer on a substrate, depositing and patterning a conductive material on the upper surface of the oxide layer to form a body electrode landing pad, a source electrode landing pad, and a drain electrode landing pad, respectively; and depositing an oxide material on the resultant and planarizing the surface, and alternately depositing first insulating layers and second insulating layers on the planarized surface to form a stacked structure.

In the method of manufacturing a three-dimensional synapse device stack according to the present inventioin, preferably the first insulating layer and the second insulating layer are made of materials having different etch ratios.

The 3D synapse device stack according to the present invention having the above-described structure and the 3D stackable synapse array using the same implement the synapse devices in a three-dimensional stacked type, thereby significantly improving the degree of integration.

In addition, according to the present invention, by adjusting the voltages applied to each electrode, selective program and selective erase operations are possible for each layer and each position with respect to the synaptse devices constituting the 3D stackable synapse array. As a result, the 3D stackable synapse array according to the present invention not only improves performance, but also improves reliability.

The 3D stackable synapse array according to the present invention having the above-described structure can be implemented as a capacitor using the insulater stack of each synapse device, and as a result, a capacitor stack structure can be provided by using the structure of the 3D synapse device stack as it is.

In addition, the 3D stackable synapse array according to the present invention having the above-described structure provides a source electrode and a drain electrode landing pads on a substrate, so that a CMOS circuit can be easily integrated under the lower portion of the 3D synapse device stack and connected to the 3D synapse device stack.

BRIEF DESCRIPTION OF THE DRAWINGS

FIGS. 18A and 18B are an equivalent circuit diagram and a table showing voltages applied to each terminal for explaining a selective erase operation among operating methods for individual layers with respect to the three-dimensional stacked AND synapse array structure shown in FIG. 16.

FIGS. 1A and 19B are an equivalent circuit diagram and a table showing voltages applied to each terminal for explaining a selective program operation among operating methods according to a position with respect to the three-dimensional stacked AND synapse array structure shown in FIG. 16.

FIGS. 20A and 20B are an equivalent circuit diagram and a table showing voltages applied to each terminal for explaining a selective erase operation among operating methods according to a position with respect to the three-dimensional stacked AND synapse array structure shown in FIG. 16.

DETAILED DESCRIPTION

Hereinafter, a three-dimensional synapse device stack made of three-dimensional stackable synapse devices according to the present invention, a three-dimensional synapse array using the three-dimensional synapse device stack, and a manufacturing method thereof will be described in detail with reference to the accompanying drawings.

3D Synapse Device Stack>

Figure 1:
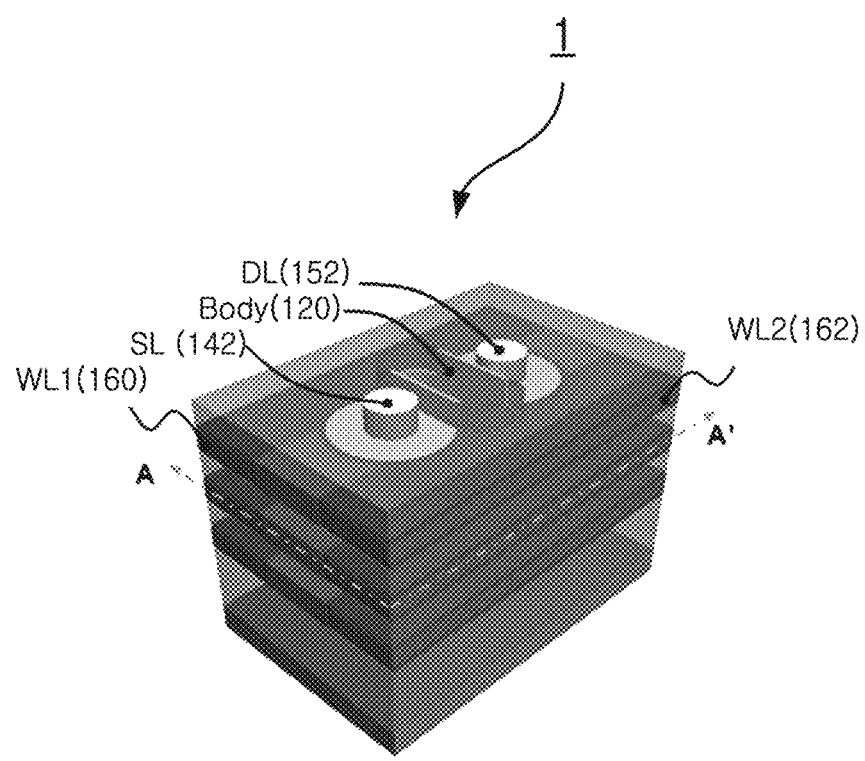
FIG. 1 is a perspective view showing a three-dimensional synapse device stack according to a preferred embodiment of the present invention.
Figure 2:
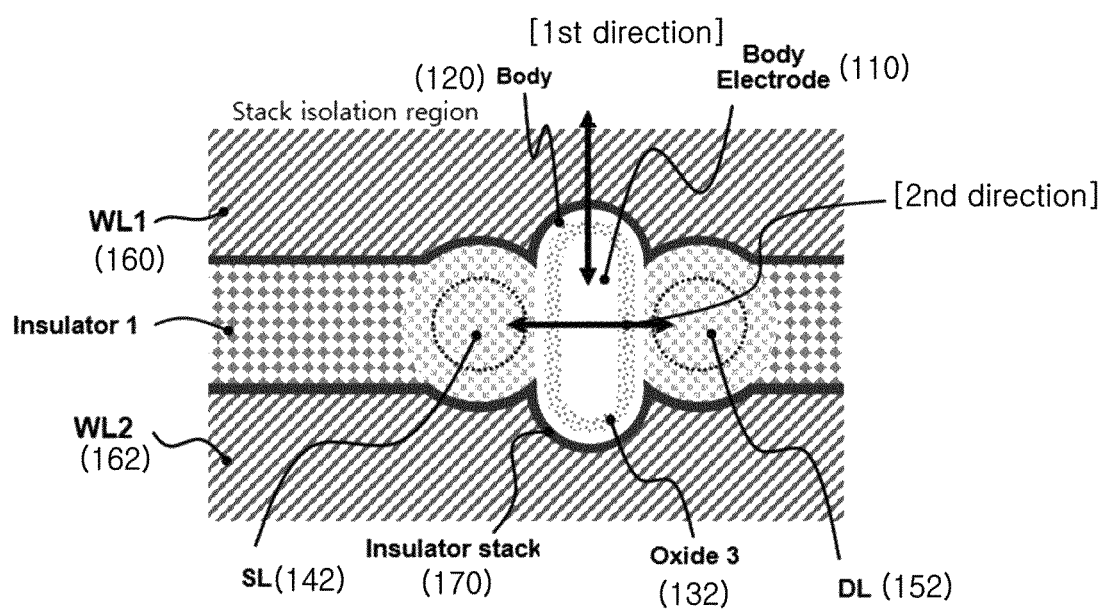
FIG. 2 is a cross-sectional view taken in the direction A-A' of FIG. 1.
Figure 3A:
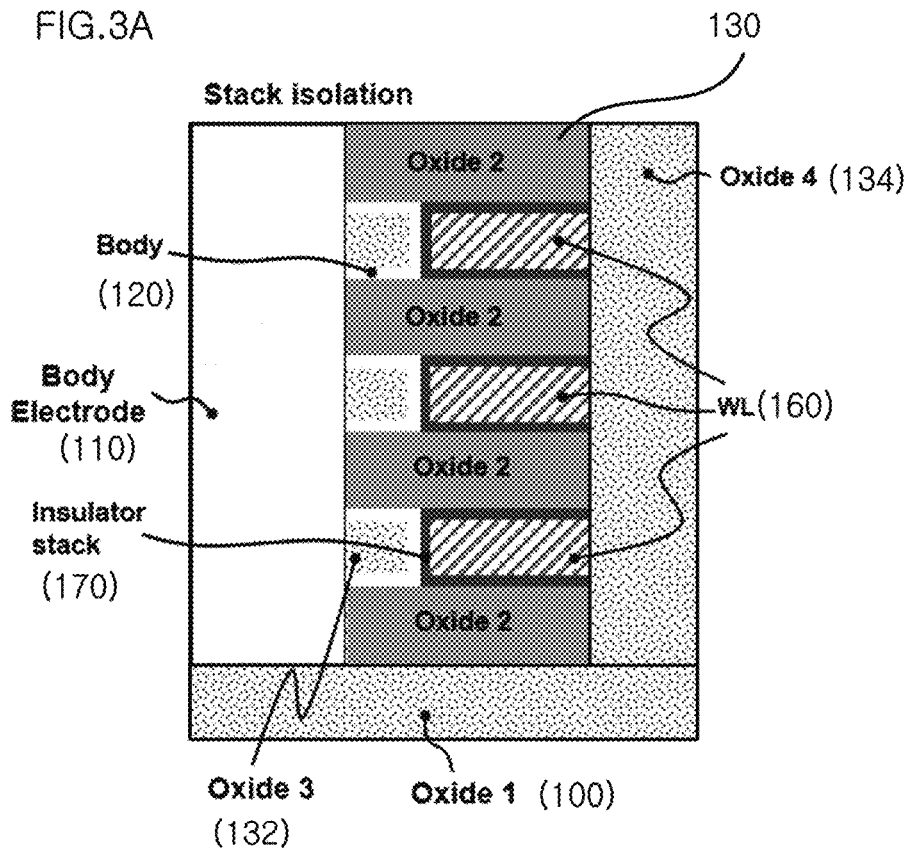
FIG. 3A is a cross-sectional view taken in the first direction of FIG. 2.
Figure 3B:
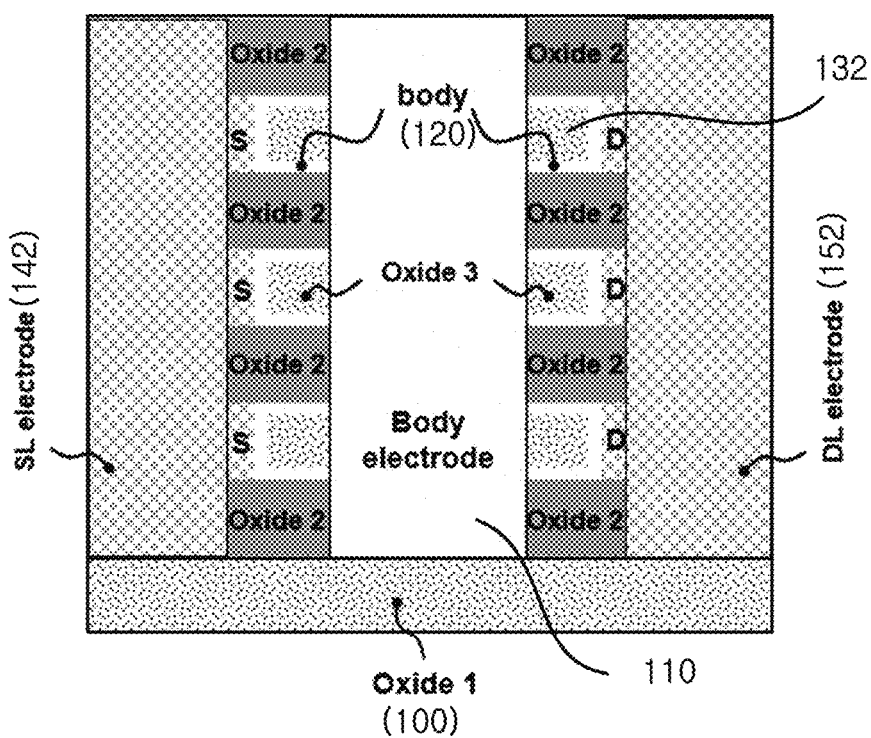
FIG. 3B is a cross-sectional view taken in the second direction of FIG. 2.

FIG. 1 is a perspective view showing a three-dimensional synapse device stack according to a preferred embodiment of the present invention FIG. 2 is a cross-sectional view taken in the direction A-A' of FIG. 1. FIG. 3A is a cross-sectional view taken in the first direction of FIG. 2, and FIG. 3B is a cross-sectional view taken in the second direction of FIG. 2.

Hereinafter, with reference to FIGS. 1 to 3, the structure and operation of a three-dimensional synapse device stack according to a preferred embodiment of the present invention will be described in detail. For convenience, in the present specification, a three-dimensional synapse device stack is described assuming that the synapse device has a stacked structure of three layers. However, the three-dimensional synapse device stack according to the present invention is not limited to the three-layer stacked structure of the synapse device, and may be manufactured as a stacked structure consisting of a plurality of more layers if necessary.

Referring to FIGS. 1 to 3, the three-dimensional synapse device stack 1 according to a preferred embodiment of the present invention includes a substrate, a body electrode 110, a plurality of semiconductor bodies 120, a plurality of first insulating layers 130, a plurality of third oxide layers 132, a plurality of sources 140, a plurality of drains 150, a source electrode line 142, a drain electrode line 152, a plurality of word lines 160 and a plurality of insulator stacks 170. A semiconductor body, a source, a drain, an insulator stack, and a word line positioned on the same layer on the outer circumferential surface of the body electrode constitute a synapse device. Each synapse device is electrically isolated by the first insulating layers. A plurality of synapse devices electrically isolated from each other by the first insulating layers are vertically stacked on the outer circumferential surface of the body electrode to constitute a single stack structure.

In addition, the three-dimensional synapse device stack according to the present invention can further improve the degree of integration by further including an additional stack structure having the same structure on the outer circumferential surface of the body electrode. The additional stack structure has additional word lines and additional insulator stacks and is configured to share sources, drains, a source line electrode and a drain line electrode of the stack structure.

The three-dimensional synapse device stack of the above-described structure is electrically isolated from the adjacent three-dimensional synapse device stack by further comprising a fourth oxide layer 134 on the surface of the word lines.

Hereinafter, each of the above-described components will be described in detail.

The upper surface of the substrate is made of a first oxide layer (Oxide 1) 100, and the three-dimensional synapse device stack according to the present invention is provided on the first oxide layer of the substrate along a vertical direction.

The body electrode 110 is disposed on the upper surface of the substrate, is provided in a pillar shape along a direction perpendicular to the surface of the substrate, and is made of a conductive material. Meanwhile, the body electrode is electrically connected to the semiconductor bodies. The conductive material used as the body electrode may include a metal having electrical conductivity, a semiconductor material doped with impurities in a high concentration, and the like.

The plurality of first insulating layers (Oxide 2) 130 and the plurality of third oxide layers (Oxide 3) 132 are positioned on the outer circumferential surface of the body electrode, and are alternately stacked on the outer circumferential surfaces of the body electrode in a vertical direction. The first insulating layer may be formed of, for example, an oxide layer. The first insulating layers and the third oxide layers electrically isolate the stackable synapse devices from each other.

The plurality of semiconductor body (Body) 120 are disposed on the outer peripheral surface of the body electrode and the surfaces of the third oxide layers, and provided by applying a semiconductor material in the form of a thin layer to partial regions of the outer circumferential surface of the body electrode 120 and the surfaces of the third oxide layers 132. The semiconductor body may be made of a semiconductor material such as polysilicon, poly-SiGe, or the like. The semiconductor body 120 having the above-described structure is configured to form a channel during device operation.

The plurality of sources (S) 140 are positioned on the outer peripheral surface of the semiconductor body, and are alternately stacked with first insulating layers positioned on the first side surface of the body electrode. The third oxide layers are disposed between the first side surface of the body electrode and the semiconductor bodies.

The plurality of drains (D) 150 are positioned on the outer peripheral surface of the semiconductor body, and are alternately stacked with the first insulating layers positioned on the second side surface of the body electrode opposite to the first side surface along the second direction. The third oxide layers are disposed between the second side surface of the body electrode and the semiconductor bodies.

The word lines (WL) 160 are positioned on the outer peripheral surface of the semiconductor body, and are alternately stacked with first insulating layers positioned on the third side and the fourth side of the body electrode, respectively. The third oxide layers are disposed between the third and fourth side surfaces of the body electrode and the semiconductor bodies. Here, the third side surface and the fourth side surface of the body electrode are opposite to each other along the first direction, and are regions located between the first side surface provided with the sources and the second side surface provided with the drains.

The plurality of insulator stack 170 are provided between at least the word lines and the semiconductor bodies, and may be further provided between the word lines and the first insulating layers. Here, the word lines located on the third side and the word lines located on the fourth side form different stack structures from each other.

As shown in FIGS. 2 and 3, in the first direction, a plurality of word lines are disposed on the outer circumferential surfaces of the semiconductor bodies and alternately stacked with first insulating layers disposed on third and fourth side surfaces of the body electrode. In the second direction, a plurality of sources and drains are positioned on outer peripheral surfaces of the semiconductor body, and the sources and drains are alternately stacked with first insulating layers positioned on first and second side surfaces of the body electrode, respectively. In this case, the semiconductor bodies positioned in the first direction and the second direction are connected to each other, and the word line surrounded by the insulator stack is positioned between the source and the drain.

The source line electrode (SL) 142 is spaced apart from the first side surface of the outer circumferential surface of the body electrode by a predetermined distance, has a pillar shape of an electrically conductive material, and is disposed on a substrate in a vertical direction. A side surface of the source line electrode is electrically connected to the side surface of the plurality of sources. The drain line electrode (DL) 152 is spaced apart from the second side surface of the outer circumferential surface of the body electrode by a predetermined distance, has a pillar shape of an electrically conductive material, and is disposed on a substrate in a vertical direction. A side surface of the drain line electrode is electrically connected to contact with the plurality of drains. The source line electrode and the drain line electrode are made of a conductive material. As the conductive material, a metal having electrical conductivity, a semiconductor material highly doped with impurities, or the like may be used. The plurality of insulator stacks 170 are provided at least between the word lines and the semiconductor bodies, and may be further provided between the word lines and the first insulating layers.

The insulator stack may be configured as a single layer or a stack structure in which at least two or more layers are stacked. The insulator stack includes a layer that stores electric charges or causes polarization. When the insulator stack is configured as a single layer, it may be formed of an oxide layer, a nitride layer, or the like. And, when the insulator stack is configured in a stack structure, it may include at least a charge storage layer and an insulating layer, a ferroelectric layer and an insulating layer, a resistance change layer and an insulating layer, or a phase change layer and an insulating layer.

Preferably, the insulator stack has a stack structure in which a plurality of layers including at least a charge storage layer and an insulating layer are stacked. The structure of the insulator stack may be implemented in various embodiments. On the other hand, when the insulator stack includes a charge storage layer and an insulating layer, preferably, no insulating layer or a thin insulating layer with a thickness of 4 nm or less is disposed between the semiconductor body and the charge storage layer, so that the program or erase operating voltage can be lowered.

In addition, the insulator stack may be configured by stacking a plurality of insulating layers. In this case, at least one of the insulating layers constituting the insulator stack includes an insulating layer having a trap for enabling charge storage. Since the insulating layer with the trap operates as a charge storage layer, the device may implement a memory function for storing information in a non-volatile form. For example, the insulator stack may have a stacked structure of a first insulating layer, a charge storage layer, and a second insulating layer, or a stacked structure of an insulating layer and a charge storage layer. Here, the insulating layer of the insulator stack may use silicon oxide, aluminum oxide, etc., and the charge storage layer may use silicon nitride, hafnium oxide, or the like.

In addition, at least one of the insulating layers constituting the insulator stack may implement a memory function for storing information in a non-volatile form using a polarization-inducing material. For example, the insulator stack may be provided in a stacked structure of a layer of material that induces polarization and an insulating layer. Here, the insulating layer of the insulator stack may use silicon oxide, aluminum oxide, or the like, and a plurality of materials including hafnium oxide (HfZrOx) may be used as the polarization-inducing material.

By the structure having the above-described configuration, the semiconductor body, the source, the drain, the insulator stack and the word line positioned on the same layer on the outer circumferential surface of the body electrode constitute a synapse device or a pail thereof. And, the synapse devices formed in each layer are electrically isolated from each other by the first insulating layers and stacked, thereby constituting a three-dimensional synapse device stack as a whole.

In addition, the additional insulator stack and the additional word line provided on the same layer on the outer peripheral surface of the body electrode share a semiconductor body, a source, a drain, a source line electrode, and a drain line electrode to constitute an additional synapse device or a part thereof. In addition, the additional synapse devices formed in each layer are electrically isolated from each other by the first insulating layers and stacked, thereby constituting a stack structure as a whole.

Accordingly, two synapse devices sharing the source and drain may be provided on the same layer on the outer circumferential surface of the body electrode, and two synapse device stacks isolated electrically from each other are provided on the outer circumferential surface of the body electrode. The present invention can provide a basic synapse device structure that can be effectively implemented by a three-dimensional stack structure. In addition, the degree of integration of the device and the performance of the device can be improved by the above-described structure according to the present invention. The three-dimensional synapse device stack having the above-described structure can be applied to various array architectures, and preferably can be applied to AND-type Synapse Array Architecture or NOR-type Synapse Array Architecture.

Hereinafter, with reference to the accompanying drawings, a method for manufacturing a three-dimensional stackable synapse array according to a preferred embodiment of the present invention will be described in detail.

Figure 4:
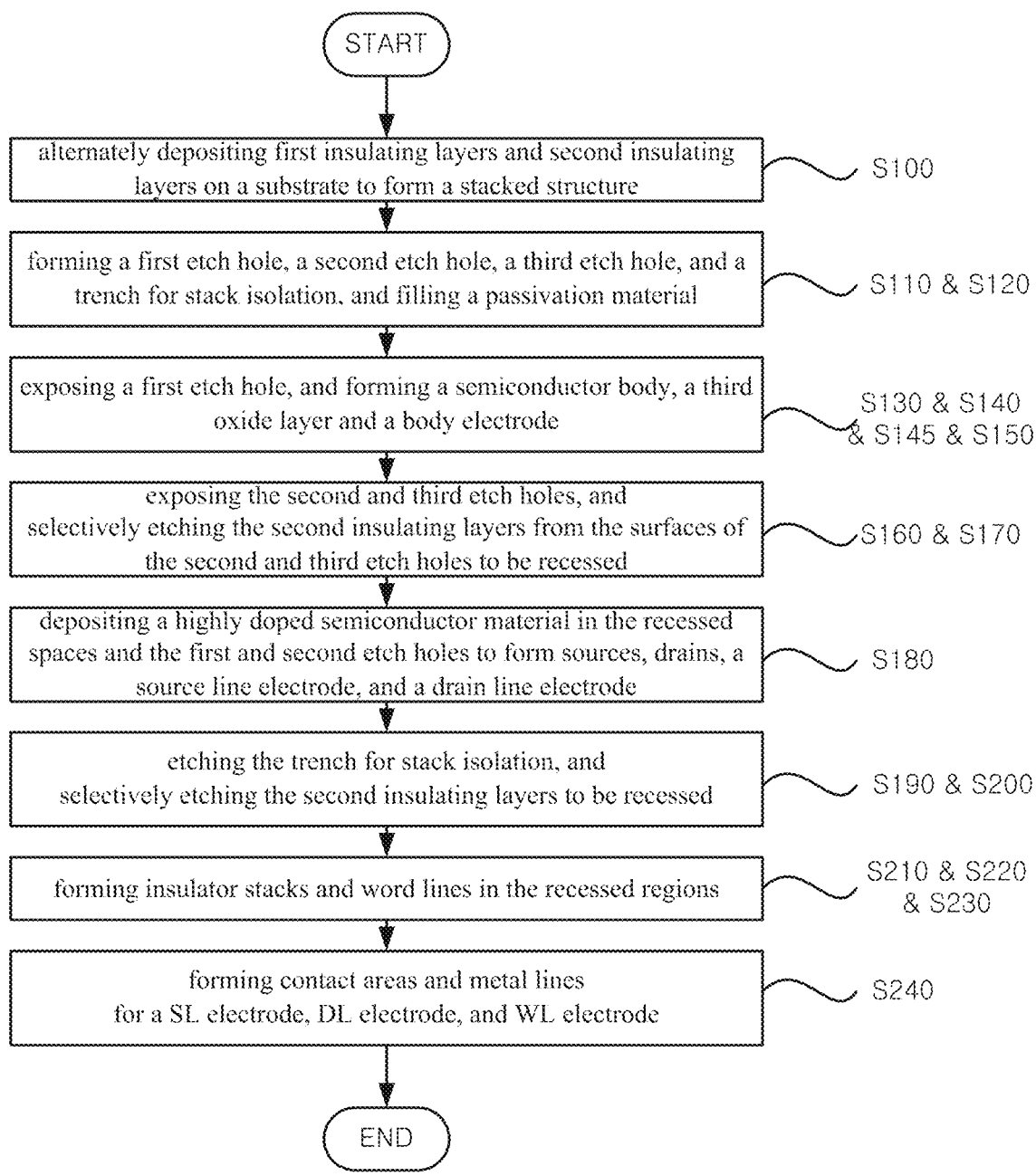
FIG. 4 is a flowchart sequentially illustrating a method of manufacturing a three-dimensional synapse device stack according to a preferred embodiment of the present invention.
Figure 5A:
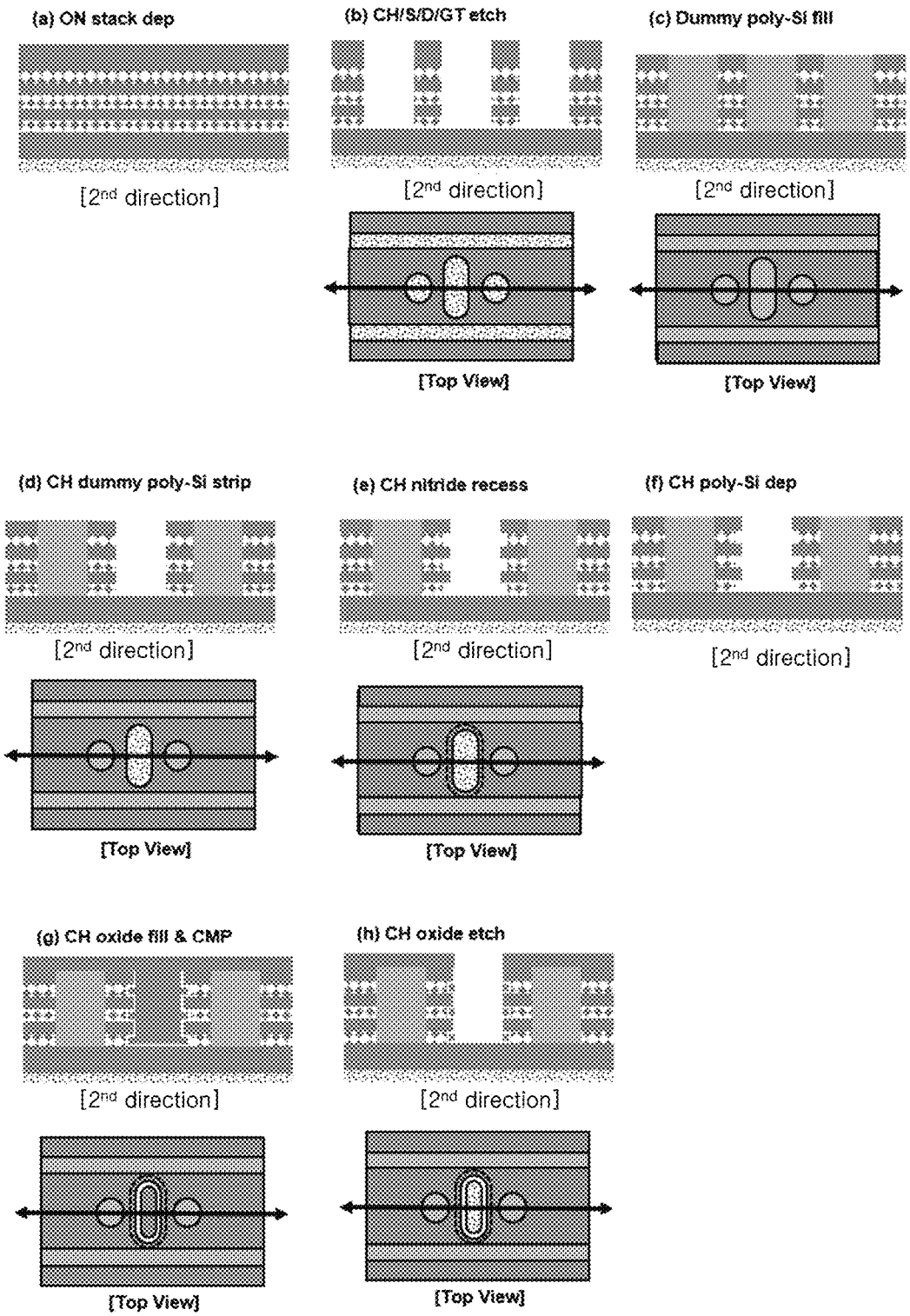
FIGS. 5A and 5B are cross-sectional views and Top Views showing the results of each step in the manufacturing method of a three-dimensional synapse device stack according to a preferred embodiment of the present invention.
Figure 5B:
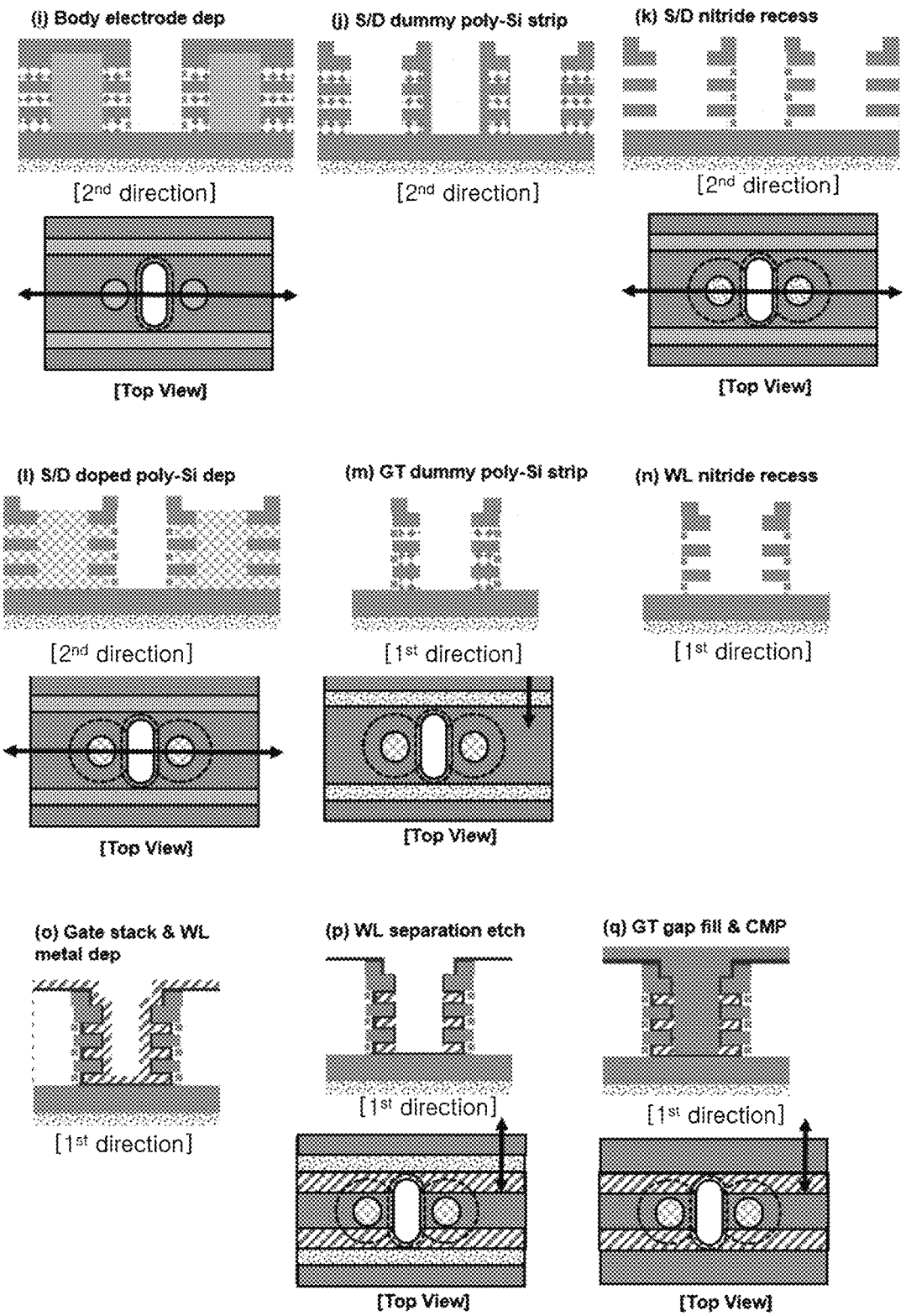

FIG. 4 is a flowchart sequentially illustrating a method of manufacturing a three-dimensional synapse device stack according to a preferred embodiment of the present invention. FIGS. 5A and 5B are cross-sectional views and Top Views showing the results of each step in the manufacturing method of a three-dimensional synapse device stack according to a preferred embodiment of the present invention.

Referring to FIGS. 4, 5A and 5B, first, the first insulating layers and the second insulating layers are alternately and repeatedly deposited on a substrate to form a stacked structure (step 100, (a) of FIG. 5A). The first insulating layer and the second insulating layer are formed of materials having different etch ratios. Therefore, it is preferable that the second insulating layers are hardly etched while the first insulating layers are being etched, and that the first insulating layers are hardly etched while the second insulating layers are being etched. Here, an oxide layer may be used as the first insulating layer, and a nitride layer may be used as the second insulating layer. Predetermined regions of the stacked structure are etched using a photolithography process to simultaneously form a first etch hole, a second etch hole, a third etch hole, and a trench for stack isolation (step 110, (b) of FIG. 5A). Next, after depositing a passivation material on the etched regions of the stacked structure the surface is planarized by chemical-mechanical polishing process (step 120, (c) of FIG. 5A). Here, as the passivation material, polysilicon for passivation may be used.

Next, the passivation material filled in the first etch hole is etched to expose the first etch hole (step 130, (d) of FIG. 5A). Then, a portion of the second insulating layers are selectively etched from the exposed surface of the first etch hole to be recessed (step 132, (e) of FIG. 5A). Then, a semiconductor body made of a semiconductor material to be used as a channel is formed in the recessed region (step 140, (f) of FIG. 5A).

Next, the inside of the first etch hole in which the semiconductor body is formed is filled with an oxide material and then planarized ((g) of FIG. 5A). Then, the third oxide layer is formed by isotropically etching the first etch hole filled with the oxide material until the first insulating layer of the stack structure is exposed (step 145, (h) of FIG. 5A). Then, a body electrode made of a semiconductor material doped with impurities is formed in the etched region (step 150, (i) of FIG. 5B).

Next, the passivation materials of the second and third etch holes are etched to expose the second and third etch holes (step 160, (j) of FIG. 5B).

Next, the second insulating layers are selectively etched from the surfaces of the second and third etch holes to be recessed (step 170, (k) of FIG. 5B). Then, a semiconductor material heavily doped with N+ is deposited in the recessed spaces to form a plurality of sources, a source line electrode connected to the sources, a plurality of drains, and a drain line electrode connected to the drains (step 180, (l) of FIG. 5B).

Next, the passivation material of the trench for stack isolation is etched to expose the trench for stack isolation (step 190, (m) of FIG. 5B). Then, the second insulating layers are selectively etched from the surface of the trench for stack isolation to be recessed (step 200, (n) of FIG. 5B). Then, the insulator stacks are deposited on the surfaces of the recessed spaces and a conductive material to be the word lines is deposited (step 210, (o) of FIG. 5B).

Next, the conductive material is isotropically etched to form a plurality of word lines isolated electrically by layers (step 220, (p) of FIG. 5B). Then, the inside of the trench for stack isolation is filled with an oxide material and then planarized the surface (step 230, (q) of FIG. 5B). Then, regions for forming wirings of the source line electrode, the drain line electrode, and the word line electrode are etched, and a metal material is deposited on the etched regions. Then, the metal material is etched using a photolithography process to form contact regions of the source line electrode, the drain line electrode, and the word line electrode (step 240).

Meanwhile, the three-dimensional synapse device stack according to a preferred embodiment of the present invention preferably further includes a body electrode landing pad 180, a source electrode landing pad 190 and a drain electrode landing pad 192.

Figure 6A:
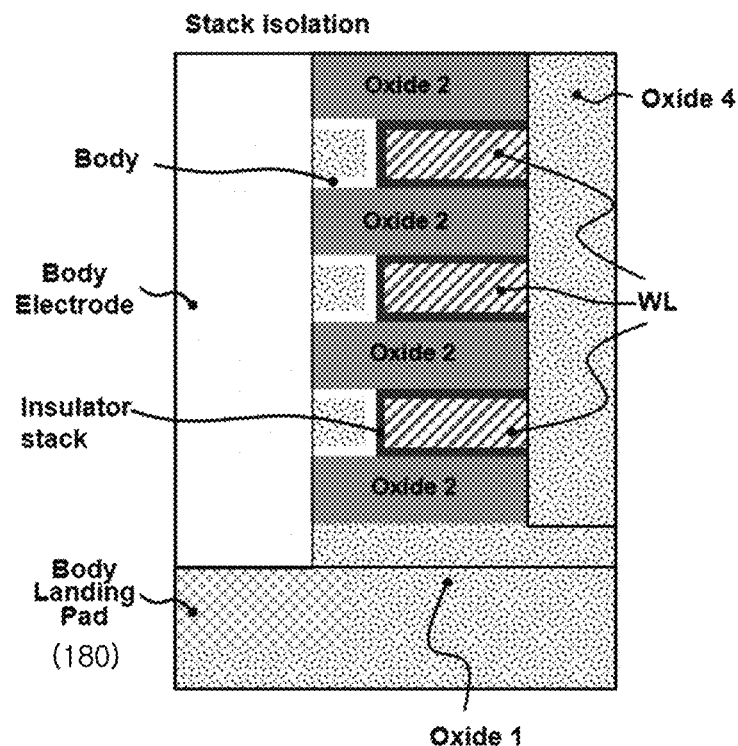
FIGS. 6A and 6B are cross-sectional views in first and second directions in which the body electrode landing pad, the source and drain electrode landing pads are shown in a three-dimensional synapse device stack according to a preferred embodiment of the present invention.
Figure 6B:
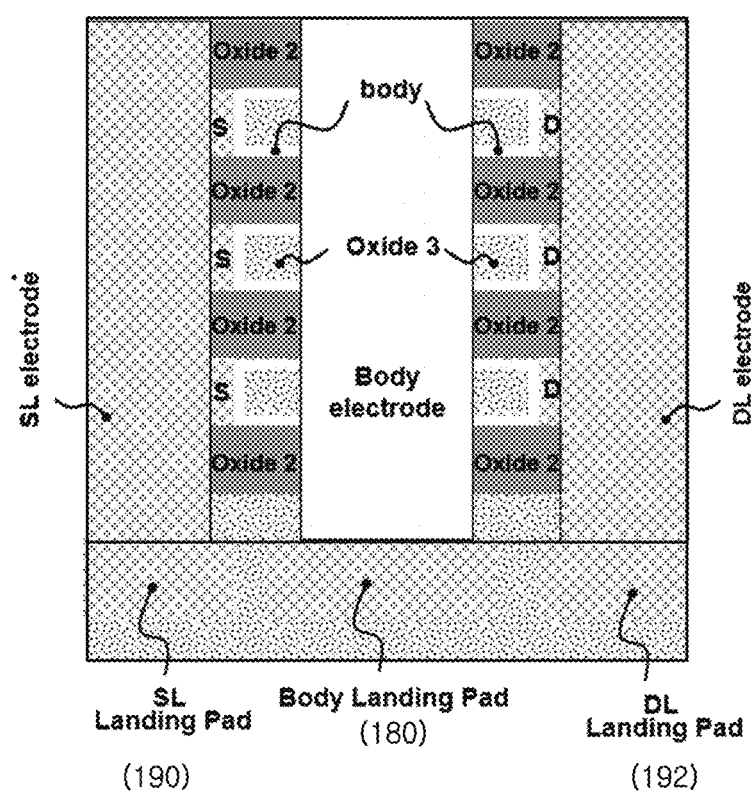

FIGS. 6A and 6B are cross-sectional views in first and second directions in which the body electrode landing pad, the source and drain electrode landing pads are shown in a three-dimensional synapse device stack according to a preferred embodiment of the present invention.

Referring to FIGS. 6A and 6B, the body electrode landing pad 180 is positioned on the first oxide layer positioned below the body electrode, and is electrically connected to the body electrode and the semiconductor body. The source electrode landing pad (SL landing pad) 190 is positioned in the first oxide layer positioned below the source line electrode, and is electrically connected to the source line electrode. And, the drain electrode landing pad (DL landing pad) 192 is positioned in the first oxide layer positioned below the drain line electrode, and is electrically connected to the drain line electrode.

The source electrode landing pad, the drain electrode landing pad, and the body electrode landing pad are made of a material having electrical conductivity, and for example, may be made of one of various metals, silicides, or semiconductor materials doped With impurities. The semiconductor material may include an amorphous semiconductor, a single crystal semiconductor, a polycrystalline semiconductor, and the like.

Figure 7:
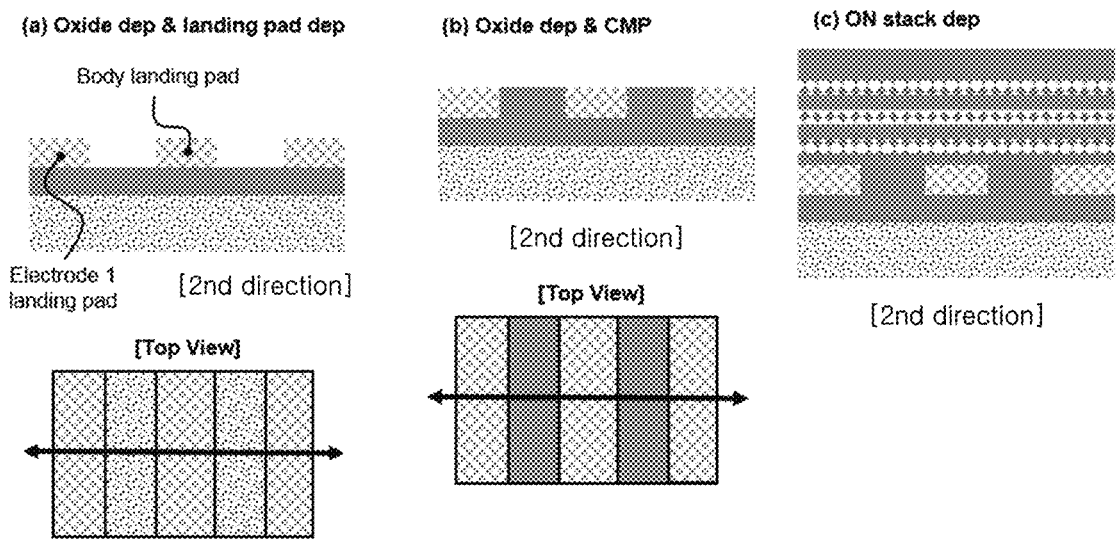
FIG. 7 is cross-sectional views and Top Views showing the results of some steps in the manufacturing method of the three-dimensional synapse device stack of the present invention shown in FIGS. 6A and 6B.

FIG. 7 is cross-sectional views and Top Views showing the results of some steps in the manufacturing method of the three-dimensional synapse device stack of the present invention shown in FIGS. 6A and 6B.

The three-dimensional synapse device stack according to the present embodiment is characterized in that it further includes a body electrode landing pad, a source electrode landing pad, and a drain electrode landing pad. Therefore, the manufacturing method of the three-dimensional synapse device stack according to the present embodiment is the same as the process described in FIGS. 4, 5A and 5B, except that the step of forming the stacked structure is slightly different. According to the manufacturing method of the three-dimensional synapse device stack according to the present embodiment, in the step of forming the stacked structure, an oxide layer is formed on the substrate, a material for an electrode is deposited on the upper surface of the oxide layer, and then patterned to form a body electrode landing pad, a source electrode landing pad and a drain electrode landing pad, respectively ((a) of FIG. 7), and an oxide layer is deposited and then planarized the surface ((b) of FIG. 7), and the first insulating layers and the second insulating layers are alternately and repeatedly formed on the planarized surface to form a stacked structure ((c) of FIG. 7).

<3D Stackable Synapse Array>

The three-dimensional stackable synapse array according to the present invention may be configured by sequentially arranging the three-dimensional synapse device stack having the above-described structure. And, an AND-type synapse array or a NOR-type synapse array may be configured according to the arrangement direction of the source line electrode and the drain line electrode connected to each three-dimensional synapse device stack.

Figure 8A:
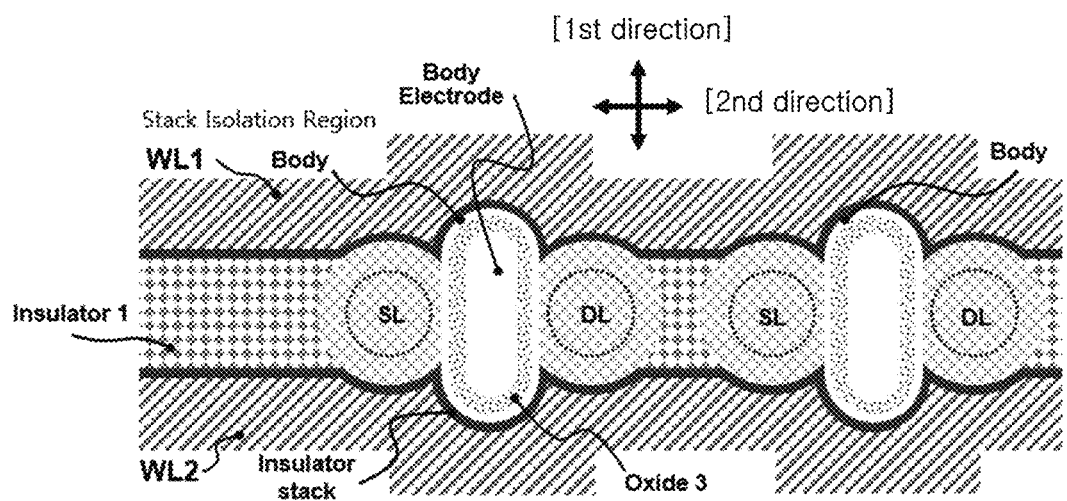
FIGS. 8A and 8B are cross-sectional views illustrating another embodiment of a word line in a three-dimensional synapse device stack according to a preferred embodiment of the present invention.
Figure 8B:
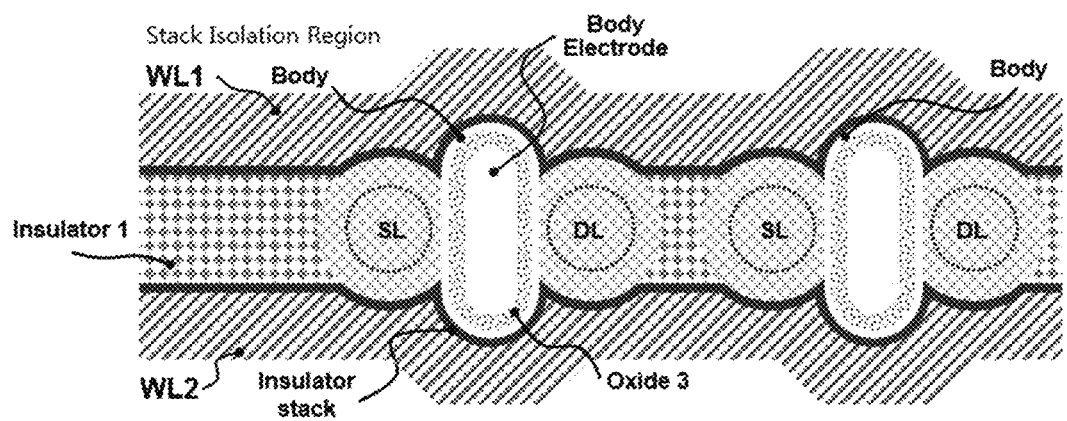

FIGS. 8A and 8B are cross-sectional views illustrating another embodiment of a word line in a three-dimensional synapse device stack according to a preferred embodiment of the present invention.

Referring to FIGS. 8A and 8B, it is preferable that the word lines (WL1 and WL2) have a predetermined length from at least an outer circumferential surface of the body electrode. Accordingly, a region adjacent to the body electrode of the word line protrudes toward the fourth oxide layer, which is a stack isolation region, compared to a region not adjacent to the body electrode. In this case, the point where the protruding area and the non-protruding area of the word line meet each other is perpendicular to each other as shown in FIG. 8A or inclined to each other at an arbitrary angle as shown in FIG. 8B. In this way, by configuring only the region adjacent to the body electrode among the word lines to protrude, it is possible to alternately arrange the adjacent three-dimensional synapse device stacks having other word lines in a zigzag form, and as a result, the degree of integration of the entire array structure can is improved. In addition, in the manufacturing process, during the wet etching process for forming the word line, it is possible to minimize damage to the body electrode and the source and drain electrodes adjacent to the word line.

Figure 9A:
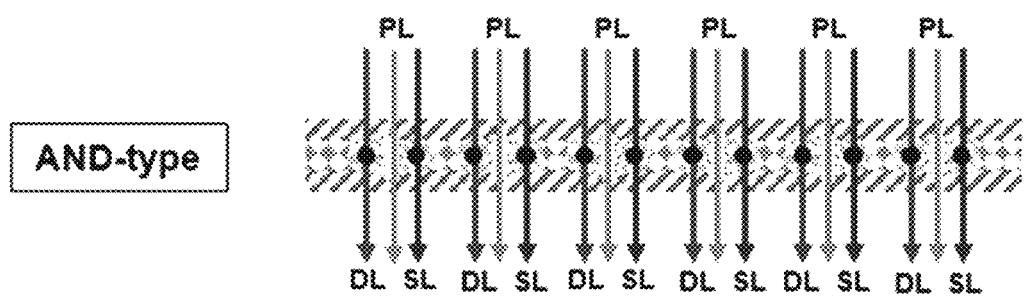
FIGS. 9A and 9B are schematic diagrams illustrating an AND-type synapse array architecture and a NOR-type synapse array architecture constructed using three-dimensional stackable synapse arrays using a three-dimensional synapse device stack according to the present invention.
Figure 9B:
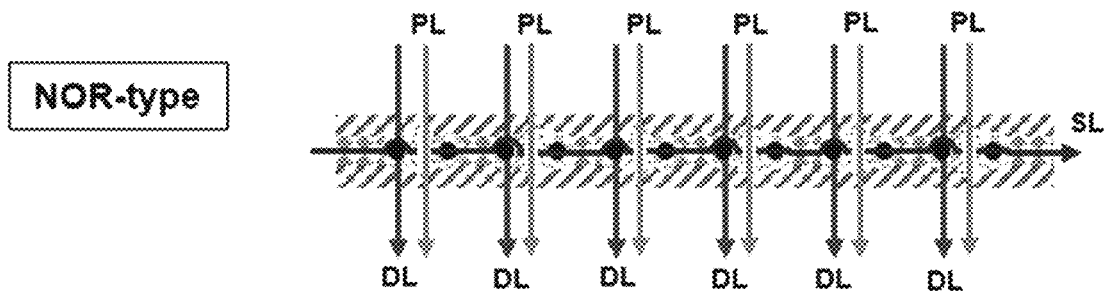

FIGS. 9A and 9B are schematic diagrams illustrating an AND-type synapse array architecture and a NOR-type synapse array architecture constructed using three-dimensional stackable synapse arrays using a three-dimensional synapse device stack according to the present invention.

Referring to FIG. 9A, in the AND type synapse array architecture, the source line electrode (SL), drain line electrode (Dl), and body electrode (PL) connected to each synapse device stack are arranged in a direction parallel to each other, and the word line (WL) is arranged on both sides of the stack, and SL, DL, PL, and WL are all electrically isolated from each other. Referring to FIG. 9B, in the NOR-type synapse array architecture, the source line electrode (SL) and the drain line electrode (DL) connected to each synapse device stack are disposed in a direction perpendicular to each other, and the drain line electrode (DL) and the body electrodes (PL) are arranged in a parallel direction, the word lines (WL) are arranged on both sides of the stack, and SL, DL, PL, and WL are electrically isolated from each other.

Figures 10A, 10B:
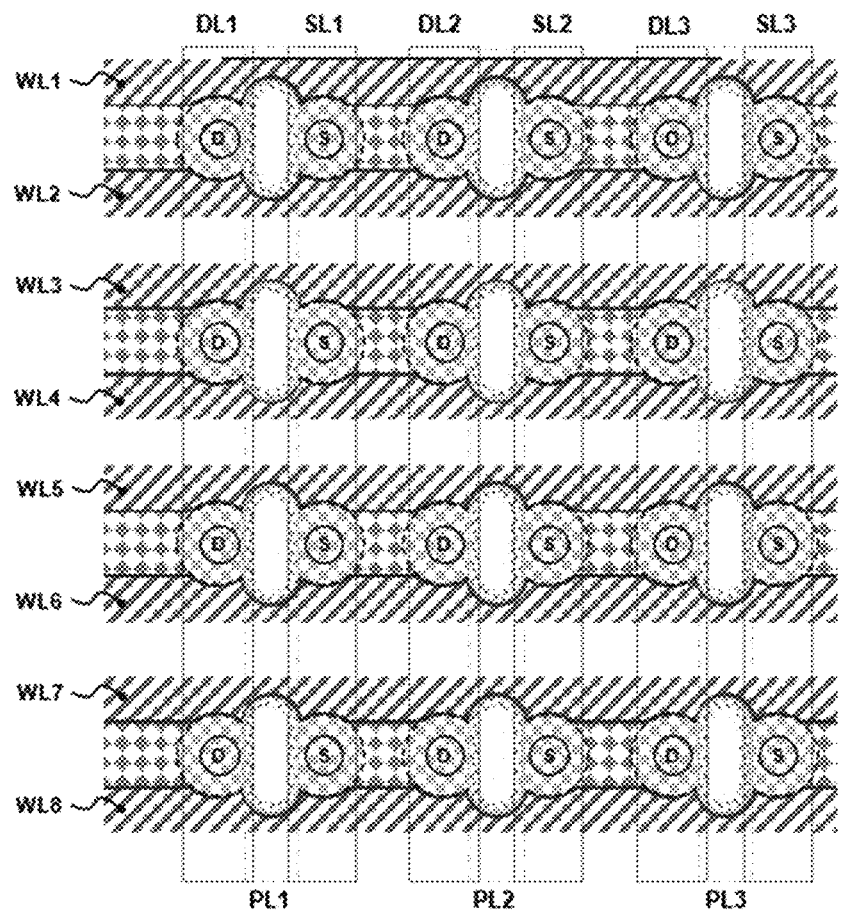
FIGS. 10A and 10B are a cross-sectional view and an equivalent circuit diagram illustrating an example of an AND-type synapse array structure in a three-dimensional stackable synapse array according to the present invention.

FIGS. 10A and 10B are a cross-sectional view and an equivalent circuit diagram illustrating an example of an AND-type synapse array structure in a three-dimensional stackable synapse array according to the present invention.

Referring to FIGS. 10A and 10B, in the AND type synapse array according to the present invention, the drain line electrodes (DL1, DL2, DL3), the source line electrodes (SL1, SL2, SL3) and the body electrodes (PL1, PL2, PL3) connected to each synapse device stack are arranged in a direction parallel to each other, and the stack structures are repeatedly arranged so that the word lines (WL1 to WL8) are arranged.

Figure 11A:
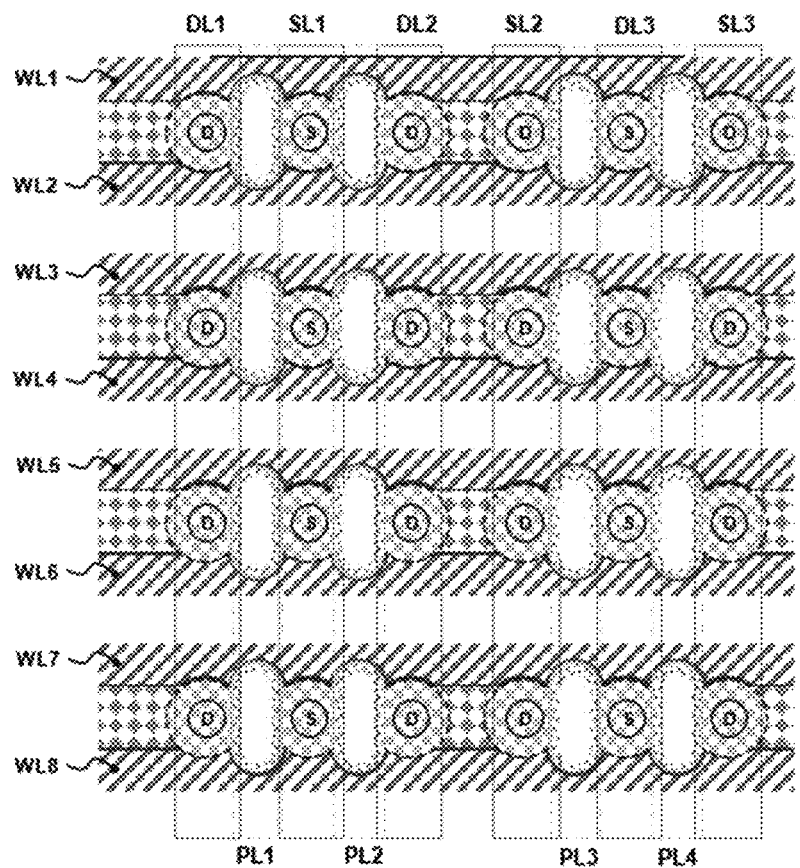
FIGS. 11A and 11B are a cross-sectional view and an equivalent circuit diagram illustrating an example of a compact AND-type synapse array structure in a three-dimensional stackable synapse array according to the present invention.
Figure 11B:
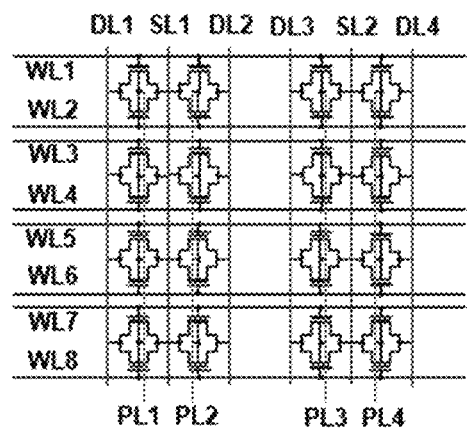

FIGS. 11A and 11B are a cross-sectional view and an equivalent circuit diagram illustrating an example of a compact AND-type synapse array structure in a three-dimensional stackable synapse array according to the present invention.

Referring to FIGS. 11A and 11B, the AND type synapse array according to the present invention is characterized in that two drain line electrodes (DL1 and DL2) share one source line electrode (SL1). Accordingly, the array structure according to the present embodiment includes two body electrodes (PL1 and PL2) spaced apart from each other by a predetermined distance, a source line electrode (SL1) between the body electrodes, and drain Line electrodes (DL1 and DL2) on the outside of the body electrodes, respectively. As a result, in the array structure according to the present embodiment, two drain line electrodes on both sides of the body electrode share one source line electrode.

Figure 12A:
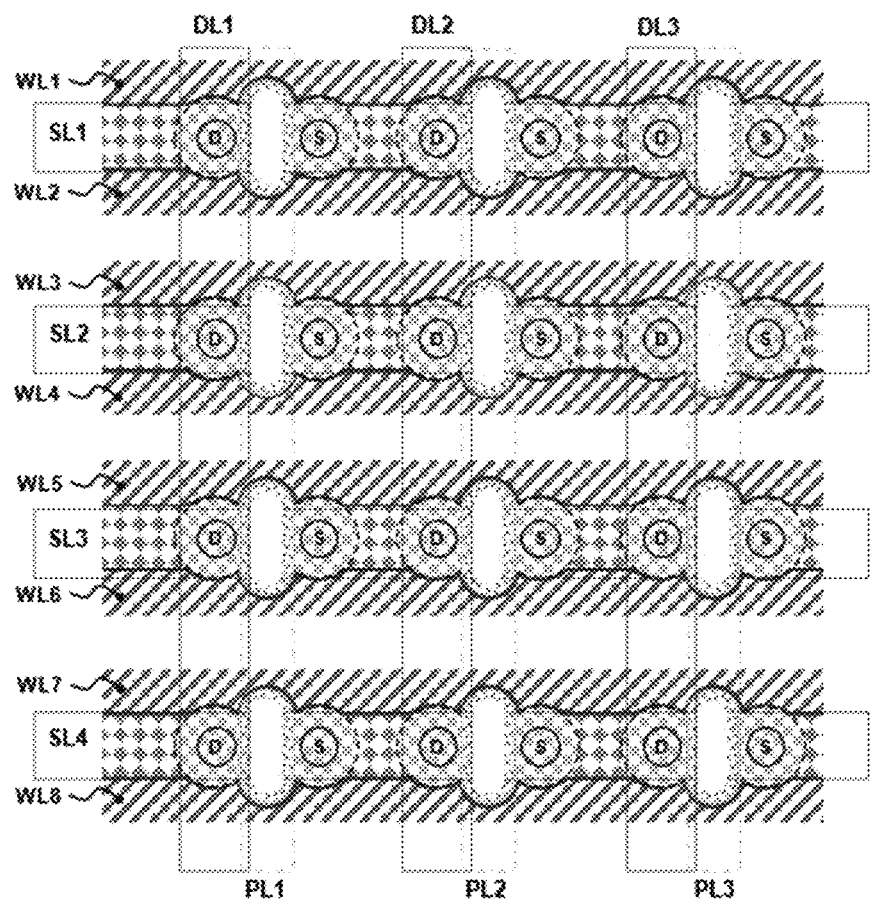
FIGS. 12A and 12B are a cross-sectional view and an equivalent circuit diagram illustrating an example of a structure of a NOR-type synapse array in a three-dimensional stackable synapse array according to the present invention.
Figure 12B:
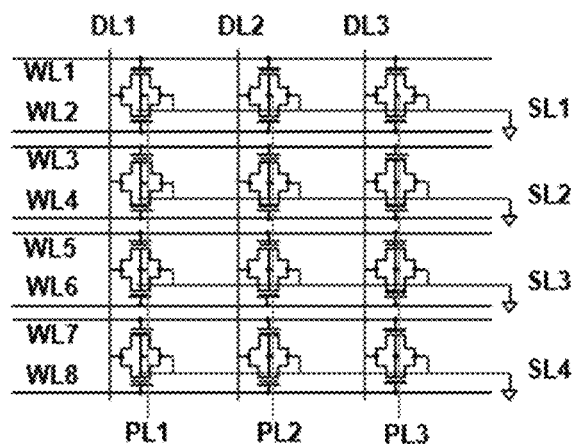

FIGS. 12A and 12B are a cross-sectional view and an equivalent circuit diagram illustrating an example of a structure of a NOR-type synapse array in a three-dimensional stackable synapse array according to the present invention.

Referring to FIGS. 12A and 12B, in the NOR-type synapse array according to the present invention, the drain line electrodes (DL1, DL2, and DL3) and the source line electrodes (SL1, SL2, SL3, and SL4) connected to each synapse device stack are disposed in a direction perpendicular to each other, and the drain line electrodes (DL1, DL2, and DL3) and the body electrodes (PL1, PL2, and PL3) are arranged in a direction parallel to each other, and the stack structures are repeatedly arranged so that the word lines (WL1 to WL8) are arranged.

Figure 13A:
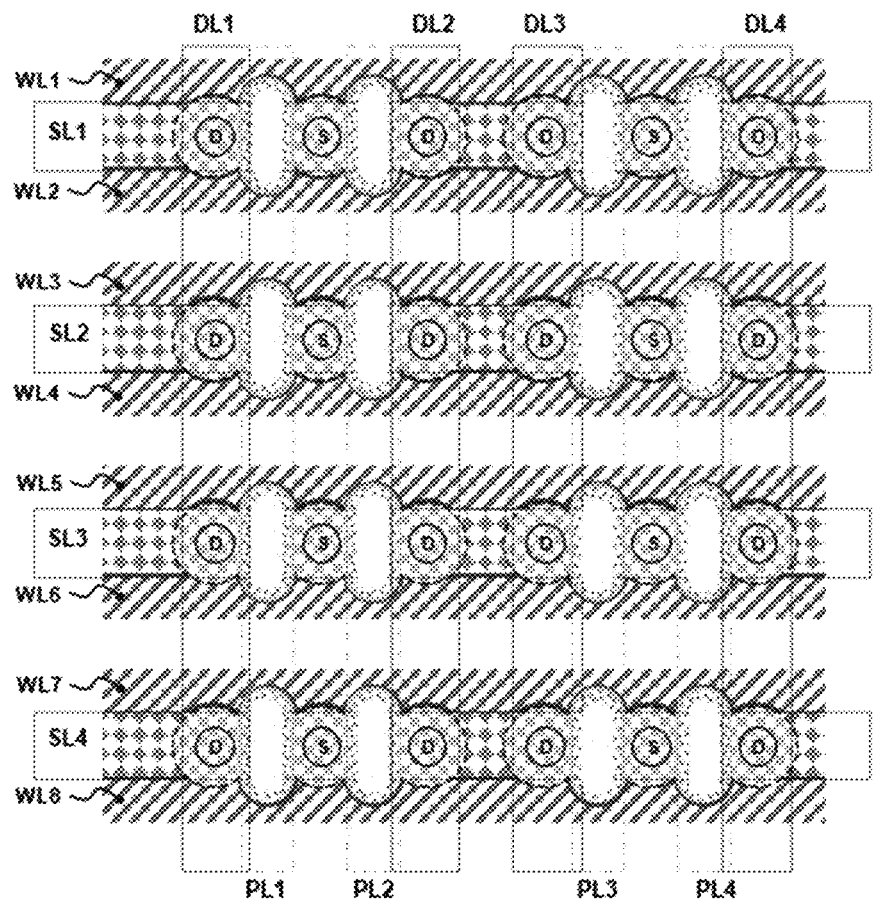
FIGS. 13A and 13B are a cross-sectional view and an equivalent circuit diagram illustrating an example of a compact NOR-type synapse array structure in a three-dimensional stackable synapse array according to the present invention.
Figure 13B:
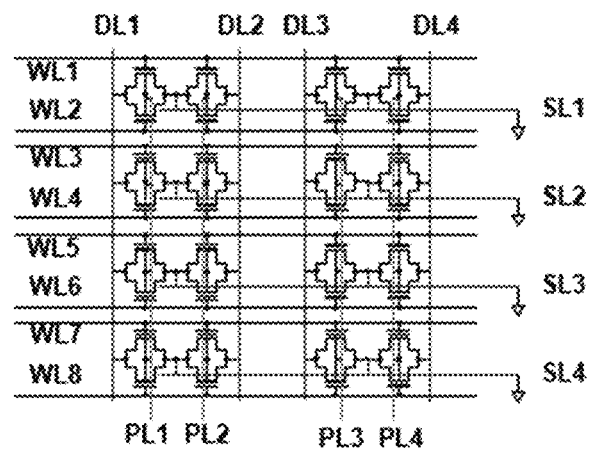

FIGS. 13A and 13B are a cross-sectional view and an equivalent circuit diagram illustrating an example of a compact NOR-type synapse array structure in a three-dimensional stackable synapse array according to the present invention.

Referring to FIGS. 13A and 13B, the NOR-type synapse array according to the present invention is characterized in that two drain line electrodes (DL1 and DL2) share one source line electrode (SL1). Accordingly, the array structure according to the present embodiment includes two body electrodes (PL1 and PL2) spaced apart from each other by a predetermined distance, a source line electrode (SL1) between the body electrodes, and drain Line electrodes (DL1 and DL2) on the outside of the body electrodes, respectively. As a result, in the array structure according to the present embodiment, two drain line electrodes on both sides of the body electrode share one source line electrode.

Figure 14:
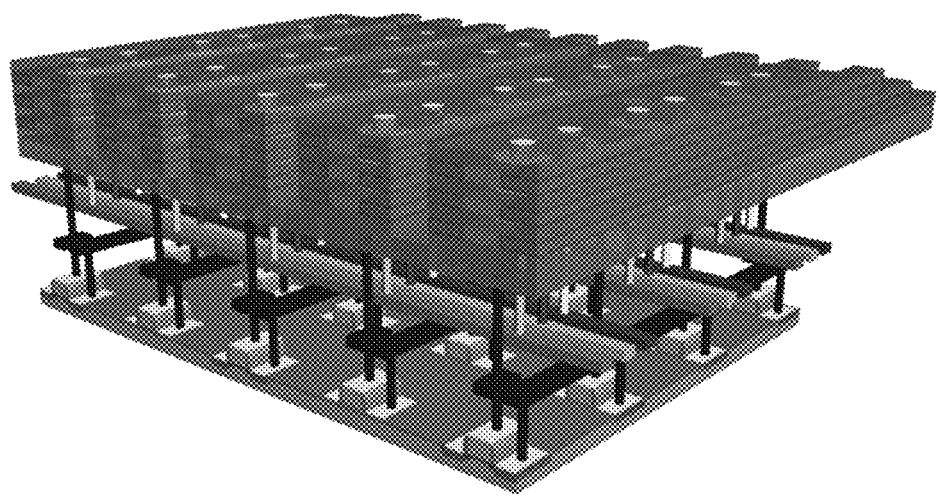
FIG. 14 is a schematic diagram illustrating an example of an AND-type synapse array structure provided on a CMOS integrated circuit in a three-dimensional stackable synapse array according to the present invention.

FIG. 14 is a schematic diagram illustrating an example of an AND-type synapse array structure provided on a CMOS integrated circuit in a three-dimensional stackable synapse array according to the present invention.

Referring to FIG. 14, by arranging all of the body electrode landing pad, the source electrode landing pad, and the drain electrode landing pad under the substrate, electrical connection with the lower CMOS integrated circuit may be facilitated.

Figure 15:
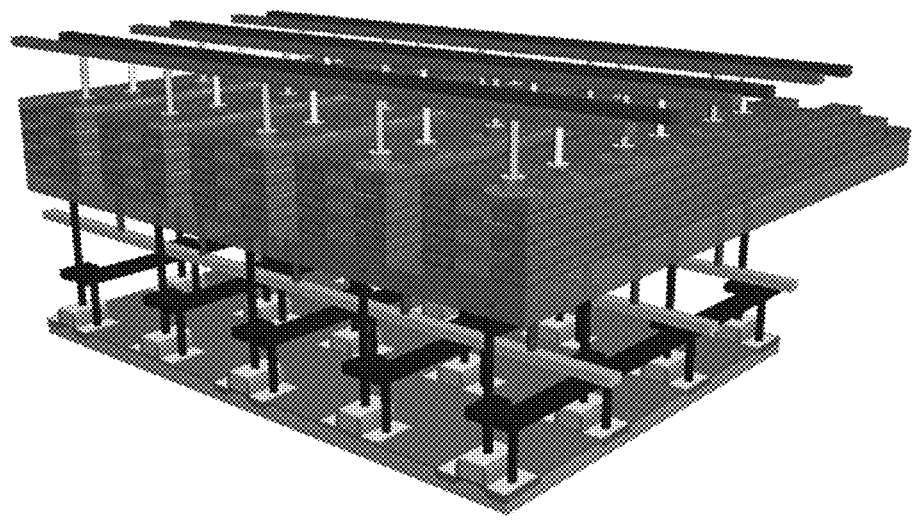
FIG. 15 is a schematic diagram showing another example of an AND-type synapse array structure provided on a CMOS integrated circuit in the three-dimensional stackable synapse array according to the present invention.

FIG. 15 is a schematic diagram showing another example of an AND-type synapse array structure provided on a CMOS integrated circuit in the three-dimensional stackable synapse array according to the present invention.

As shown in FIG. 15, in the array structure according to the present invention, the body electrode landing pad may be disposed under the substrate, and the source electrode landing pad and the drain electrode landing pad may be disposed above the stack structure.

<Selective Program and Erase Operations>

Hereinafter, in the three-dimensional stackable synapse array according to the present invention, selective program and selective erase operations for a target device will be described with reference to the accompanying drawings.

Figure 16:
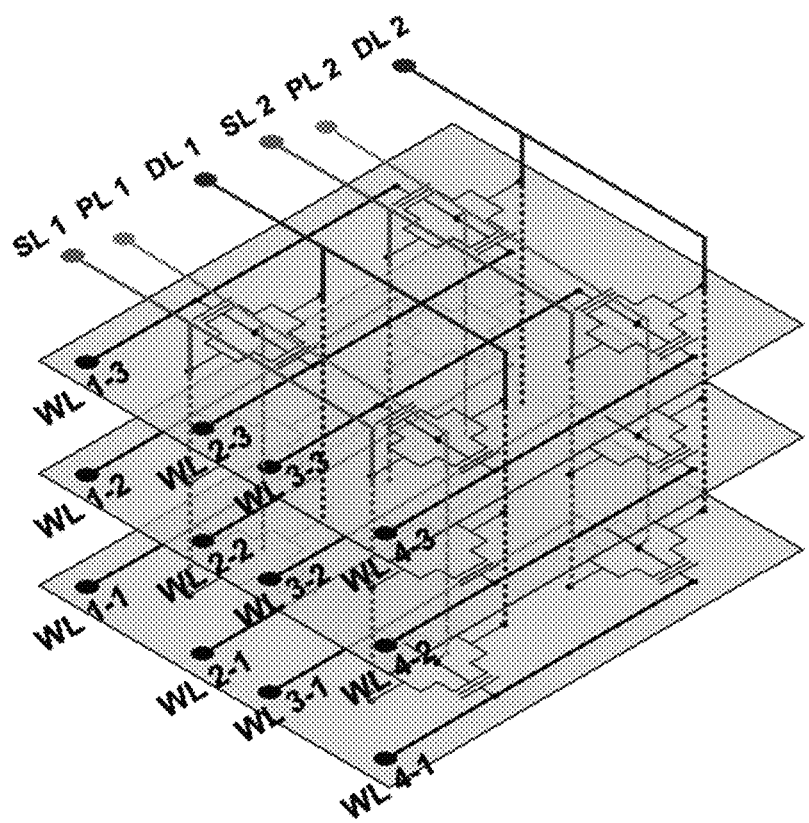
FIG. 16 is an equivalent circuit diagram of an example of a three-dimensional stacked AND synapse array according to a preferred embodiment of the present invention.

FIG. 16 is an equivalent circuit diagram of an example of a three-dimensional stacked AND synapse array according to a preferred embodiment of the present invention.

The three-dimensional stackable synapse array shown in FIG. 16 is a three-dimensional stackable synapse array structure in which three layers are vertically stacked and four pairs of devices are horizontally provided, and it consists of 12 WLs and two SLs and DLs, and is an AND type synapse array.

Hereinafter, in the three-dimensional stackable synapse array according to the present invention, a selective program and erase operation in the Z-axis direction, which are operating methods of an individual layer, will be described.

Figures 17A, 17B:
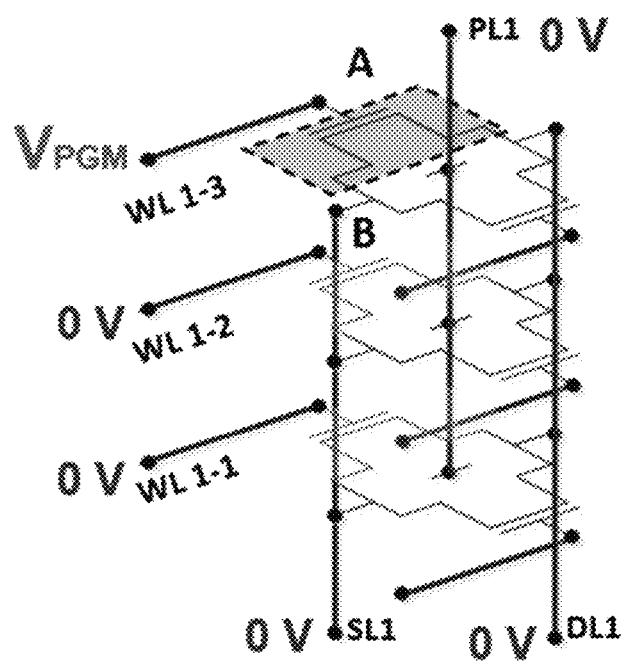
FIGS. 17A and 17B are an equivalent circuit diagram a table showing voltages applied to each terminal for explaining a selective program operation among operating methods for individual layers with respect to the three-dimensional stacked AND synapse array structure shown in FIG. 16.

FIGS. 17A and 17B are an equivalent circuit diagram and a table showing voltages applied to each terminal for explaining a selective program operation among operating methods for individual layers with respect to the three-dimensional stacked AND synapse array structure shown in FIG. 16.

Referring to FIGS. 17A and 17B, first, for a program operation to the target layer, a preset program voltage ($V_{PGM}$) is applied to the WL of the selected layer, and 0 V is applied to each of SL, DL, and PL connected to the WL, so that electrons are injected using the F-N tunneling mechanism. At this time, 0 V is applied to the WL of the unselected layer to prevent the program operation. Here, $V_{PGM}$ is a positive voltage large enough to cause F-N tunneling between the WL line and the insulator stack.

FIGS. 18A and 18B are an equivalent circuit diagram and a table showing voltages applied to each terminal for explaining a selective erase operation among operating methods for individual layers with respect to the three-dimensional stacked AND synapse array structure shown in FIG. 16.

Referring to FIGS. 18A and 18B, in the structure according to the present Invention, since there is a body electrode capable of supplying holes, holes are supplied using the FN-tunneling mechanism. For an erase operation, 0V is applied to the WL of the selected target device and a preset erase voltage $V_{ERS}$ is applied to the body electrode PL to inject holes. At this time, a preset inhibition voltage $V_{INH}$ is applied to the WL of the unselected layer to prevent hole injection. Here, $V_{ERS}$ is a positive voltage large enough to generate holes by a gate induced drain leakage (GIDL) current between the WL line and the DL line and inject the holes into the insulator stack The $V_{INH}$ is a voltage that prevents the generated holes from being injected into the insulator stack of a neighboring device, and is generally preferably half of the $V_{ERS}$ value.

Hereinafter, in the three-dimensional stackable synapse array according to the present invention, an operating method according to each position, selective program and erase operations in the XY-axis direction will be described, FIGS. 19A and 19B are an equivalent circuit diagram and a table showing voltages applied to each terminal for explaining a selective program operation among operating methods according to a position with respect to the three-dimensional stacked AND synapse array structure shown in FIG. 16.

Referring to FIGS. 19A and 19B, similarly to the operating method for the individual layers of FIGS. 17A and 17B, first, the program voltage $V_{PGM}$ is applied to the WL of a target device selected for a program operation, 0V is applied to each of SL, DL, and PL of a target device selected for a program operation, so that electrons are injected using the F-N tunneling mechanism. Then, 0 V is applied to the WL of the unselected device and $V_{INH}$ is applied to the PL to prevent the program operation.

FIGS. 20A and 20B are an equivalent circuit diagram and a table showing voltages applied to each terminal for explaining a selective erase operation among operating methods according to a position with respect to the three-dimensional stacked AND synapse array structure shown in FIG. 16.

Referring to FIGS. 20A and 20B, also during the erase operation, in the structure according to the present invention, by using the body electrode (PL), holes may be injected using the F-N tunneling mechanism. Therefore, for the erase operation, the $V_{ERS}$ voltage is applied to the PL of the selected device and 0V is applied to the WL to inject holes. At this time, $V_{INH}$ is applied to WL of the unselected device and 0V is applied to PL to prevent hole injection.

In the above, the present invention has been described with respect to the preferred embodiment thereof, but this is only an example and does not limit the present invention. It will be appreciated that various modifications and applications not exemplified above are possible within the scope. And, the differences related to these modifications and applications should be construed as being included in the scope of the present invention defined in the appended claims.

What is claimed is:

1. A three-dimensional synapse device stack, which comprises:
    a substrate having an upper surface formed of a first oxide layer;
    a body electrode having a pillar shape, made of an electrically conductive material and dispoed on the substrate in a vertical direction,
    a plurality of first insulating layers disposed on an outer circumferential surface of the body electrode;
    a plurality of third oxide layers disposed on the outer circumferential surface of the body electrode and alternately stacked with the first insulating layers;
    a plurality of semiconductor bodies disposed on an outer circumferential surface and the surface of the third oxide layers, made of semiconductor materials and electrically connected to the body electrode, and alternately stacked with the first insulating layers;
    a plurality of sources disposed on an outer circumferential surface of the semiconductor bodies and alternately stacked with first insulating layers positioned on a first side surface of the body electrode;
    a plurality of drains disposed on an outer circumferential surface of a semiconductor bodies and alternately stacked with the first insulating layers positioned on a second side surface of the body electrode opposite to the first side surface;
    a source line electrode having a pillar shape, disposed on the substrate in a vertical direction and electrically connected to the plurality of sources;
    a drain line electrode having a pillar shape, disposed on the substrate in a vertical direction and electrically connected to the plurality of drains;
    a plurality of word lines disposed on an outer circumferential surface of the semiconductor bodies and alternately stacked with first insulating layers positioned on a third side surface of the body electrode; and
    a plurality of insulator stacks disposed between the word lines and the semiconductor bodies;
    wherein the semiconductor body, the source, the drain, the insulator stack and the word line located on the same layer on the outer peripheral surface of the body electrode constitute a synapse device or a part thereof, and the synapse devices electrically isolated from each other by the first insulating layers and the third oxide layers are stacked to form a stack structure.

2. The three-dimensional synapse device stack according to claim 1, wherein the insulator stack is composed of a single insulating layer or a stack structure in which a plurality of layers are stacked; and when configured in a stack structure, the insulator stack comprises at least a charge storage layer and an insulating layer, at least a ferroelectric layer and an insulating layer, at least a resistance change layer and an insulating layer, or at least a phase change layer and an insulating layer.

3. The three-dimensional synapse device stack according to claim 1, which further comprises a body electrode landing pad located in the first oxide layer and made of an electrically conductive material and electrically connected to the body electrode.

4. The three-dimensional synapse device stack according to claim 1, which further comprises:
    a source electrode landing pad located in the first oxide layer and made of an electrically conductive material and electrically connected to the source line electrode; and
    a drain electrode landing pad disposed in the first oxide layer and made of an electrically conductive material and electrically connected to the drain line electrode.

5. The three-dimensional synapse device stack according to claim 1, which further comprises an additional stack structure which shares the source line electrode and the drain line electrode,
    wherein the additional stack stucture includes a plurality of additional word lines disposed on outer circumferential surfaces of the semiconductor bodies and alternately stacked with first insulating layers disposed on a fourth side surface of the body electrode opposite to the third side surface and a plurality of additional insulator stacks disposed between the additional word lines and the semiconductor body, and
    wherein the semiconductor body, the source, the drain, the additional insulator stack and the additional word line located on the same layer on the outer circumferential surface of the body electrode constitute an additional synapse device or a part thereof, and
    the synapse device and the additional synapse device located on the same layer share a source and a drain.

6. A three-dimensional stackable synapse array, characterized in that the three-dimensional synapse device stacks according to claim 1 are arranged in an array form.

7. The three-dimensional stackable synapse array according to claim 6, wherein the three-dimensional stackable synapse array constitutes an AND-type synapse array by arranging the source line electrodes and the drain line electrodes connecting the three-dimensional synapse device stacks side by side, or a NOR-type synapse array by arranging the source line electrodes and the drain line electrodes connecting the three-dimensional synapse device stacks to cross each other.

8. The three-dimensional stackable synapse array according to claim 6, which further comprises a three-dimensional capacitor stack having the same structure as a three-dimensional synapse device stack.

9. The three-dimensional stackable synapse array according to claim 6, which further comprises a CMOS integrated circuit used as a peripheral circuit under the substrate.

* * * * *